– Patented July 30, 1968

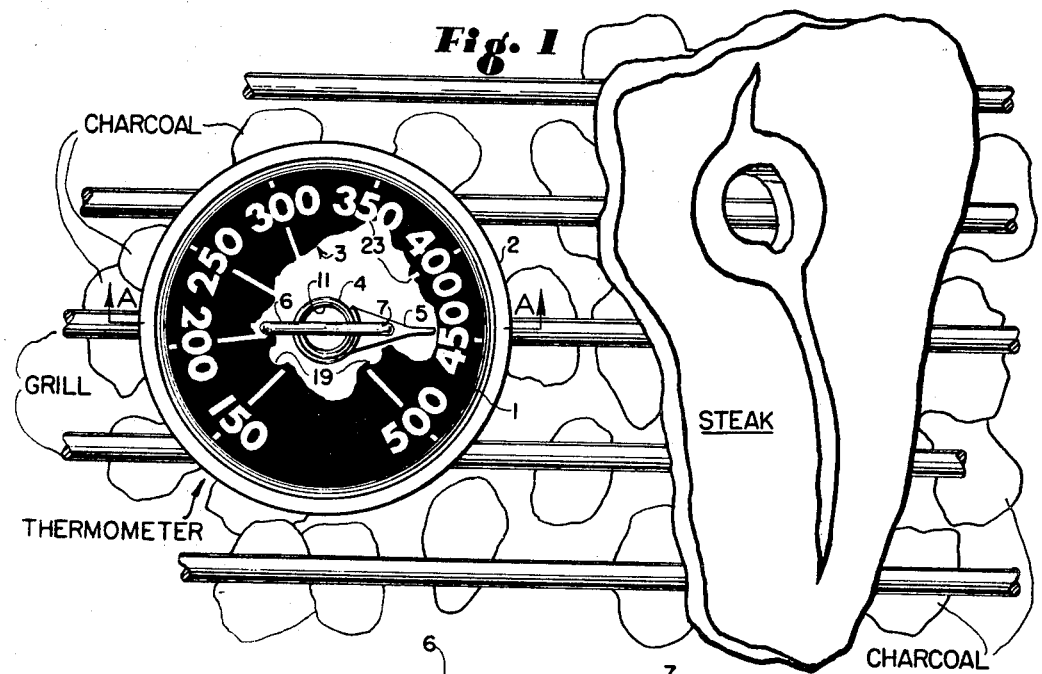
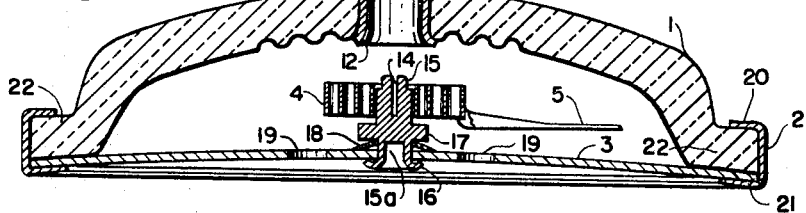
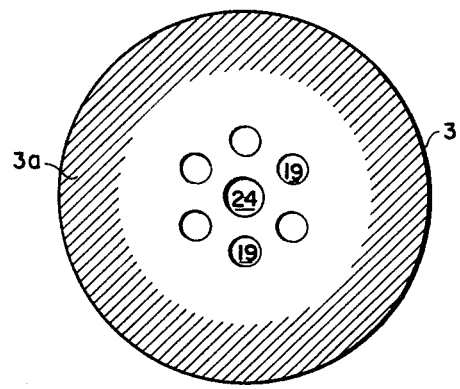

3,394,593
GRILL THERMOMETER
Clarence Foster Aldridge, Asheville, N.C., and Richard J. Melville, Rochester, N.Y., assignors to Taylor Instrument Companies, Rochester, N.Y., a corporation of New York
Filed Apr. 5, 1965, Ser. No. 445,420
11 Claims. (Cl. 73—363.9)

ABSTRACT OF THE DISCLOSURE

Grilling of food such as steak is controlled in accordance with a grill thermometer having a portion exposed like the steak to the grilling radiant heat. The said portion is a stainless steel plate, blackened and perforated. A bimetallic coil next to the plate measures the temperature of the plate. The plate is part of a casing housing the coil and allowing free flow of gases through the casing and escape therefrom of radiant heat. In effect, the plate simulates the response of the steak surface to radiant heat.

---

This invention relates to measuring the temperature of a food surface subjected to radiant heat, and its main object is to provide a novel thermometer paticularly adapted to measure such temperature. Another object is to provide a new and improved thermometer.

A thermometer according to the invention includes a radiant heat collecting element and a heat sensing element, the arrangement being that when the former element is heated by radiant heat and the latter element receives heat from the said former element, the response of said latter element is indicative of the temperature that would be attained by a food surface exposed to and heated by said radiant heat.

The particular application of a thermometer according to the invention is in the grilling of protein food such as beefsteak, pork, fish, poultry, and the like, typically a matter of placing the food on a grillwork a few inches above a bed of burning charcoal, or other radiant heat source suitable for grilling the enumerated foodstuffs.

The utility of the novel thermometer arises in the fact that scientific studies of various sorts have shown that it is necessary to limit the temperature of the food surface being grilled in order to obtain what may be considered, from gustatory, esthetic and hygienic considerations, the best results.

In the case of beefsteak, for example, it has been shown that this foodstuff is grilled to the juiciest, tenderest, tastiest and most nutritious condition under grilling conditions such that the surfaces of this foodstuff are not heated above about 350° F. It also appears that the beef fat will not drip from the meat except at temperatures above 350° F. Since it has been found that the combustion products of fat drippings may include carcinogenic substances, it is therefore advisable to prevent the fat from dripping into the radiant heat source since if the latter is under the meat, the meat will be more or less bathed by the vapors and fumes resulting from combustion of the fat.

Though the general public heretofore has been accustomed to grill its steaks by rule of thumb, it is evident that it is advisable to control the grilling process more precisely. Insofar as we are aware, no technique or instrument exists, or has been proposed, such as would be suitable for use to this end by the general public. Thus, we have tested available instruments which by reason of their ease of use, simplicity, cost and design seemed to be likely candidates. However, when put to the test, these instruments seriously underestimated meat-surface temperatures. The instrument we have devised is such, however, that if it indicates a temperature of 350° in the case of steak-grilling, the user may be sure that there will be substantially no dripping of fat, or untoward drying out, or toughening, or nutrient destruction, such as would occur were its surface raised to a higher temperature.

In the drawings:
FIGURE 1 is a plan view of the thermometer according to the invention in use;
FIGURE 2 is an enlarged view of the thermometer of FIGURE 1, the view being a partial section normal to the plane of FIGURE 1, and on the section line A—A; and
FIGURE 3 is a bottom view of the thermometer of FIGURE 1 on the scale of FIGURE 2.

In FIGURE 1, which in the appended drawing is about full scale of a practical embodiment of our invention, the labels STEAK, GRILL, CHARCOAL and THERMOMETER succinctly define a typical grilling situaton, namely, the usual steak (or other viand) is being supported on the usual grill over the usual bed of more or less incandescent charcoal, the steak's under surface (that turned away from view in FIGURE 1) thus being subjected to the radiant energy from the charcoal bed's upper surface, which surfaces are generally parallel.

In addition, however, the object labelled THERMOMETER, which is a thermometer according to the present invention, is being grilled along with the steak, that is, its under surface (the surface turned away from view in FIGURE 1) is being subjected to substantially the identical radiant heat source as is the aforesaid under surface of the steak.

The thermometer comprises a dome-like glass cover 1, a bezel 2, a bottom plate 3, a bimetallic spiral coil 4 having a pointer 5 projecting radially from the outer end of the coil 4, and a hanger 6 having a free end 7 and a circular eye 8 forming its other end. Eye 8 rests flat on a circular boss 9 of the cover 1, there being a sleeve-like eyelet 10 passing into the space between cover 1 and plate 3, via a hole in cover 1, through the boss 9. The end 11 of eyelet 10 is swaged over the eye 8 to hold it against the boss securely, but not so tightly that the hanger 6 cannot be rotated on the vertical axis containing the center of eye 8 to a desired position which it will maintain by reason of the friction between the eye 8 and flange 11 and boss 9. The other end 12 of eyelet 10 is swaged over against the inner side of dome 1 in order to complete this arrangement of hanger 6.

The inner end of coil 4 is fixed in a slot 14 of a rivet 15, the rivet 15 being fixed to plate 3 by having its lower end passed through the plate and swaged at 16 over the bottom side of plate 3, rivet 15 having a collar 17 integral therewith above the plate 3, and there being a spring washer 18 around the rivet 15, resiliently pushing against collar 17 so as to draw the swaged portion 16 tightly against the plate 3, but not so tightly that a suitable tool, inserted in a socket 15a at the lower end of rivet 15 cannot be used to turn the rivet 15 to a desired angular position with respect to its long axis which preferably is located on the same vertical as that containing the axis of eyelet 10.

The plate 3 has holes 19 which, along with eyelet 10, provide for passage of the ambient atmosphere into and out of the space between plate 3 and cover 1. The bezel 2, it will be seen, has portions 20 and 21, respectively, spun over the upper margin of a peripheral flange portion 22 of cover 1 and over the lower peripheral margin of plate 3.

Bimetallic spiral coil 4 has the usual property of rotating its free end about its spiral axis in one sense or the other depending on in what sense its temperature is changing. As this free end carries pointer 5, it is evident that the angular position of pointer 5 about the aforesaid vertical is a measure of the temperature of the spiral 4. Accordingly, a scale of numbers and index marks such as is generally indicated at 23, FIGURE 1, is provided on the upper side of plate 3, over which pointer 5 sweeps, as the temperature of spiral 4 changes, thus providing a means of quantifying the angular position of pointer 5 and, as well, of the free end 7 of hanger 6.

To calibrate the therometer we simply expose it to a gaseous atmosphere having a uniform temperature of 350° F., for sufficient time to assure the spiral 4 attaining as nearly as possible that temperature. If pointer 5 does not indicate 350° F., we then insert a suitable tool into well 15a, force rivet 15 to turn about its long axis in such direction and such amount as to bring pointer 5 to the 350 index mark on scale 23, and remove the screw driver without further turning of rivet 15. The proportioning of the scale and its numbering are such that for a given type of bimetallic coil reading correctly at about the center of the scale, the readings of the instrument will be correct to within 5° F. or 10° F. at any other place on the scale when the coil 4 is heated to any given temperature in the range over which it is designed to be used.

In principle, what has been described thus far is a conventional sort of device, such as one might contemplate using to measure the temperature of some gaseous or liquid body in which one could immerse the device, and in fact the thermometer is quite suitable for such purposes.

However, in the use portrayed in FIGURE 1, a rather different situation arises. What is to be measured is the temperature of the meat surface exposed to radiant energy, and what happens in the cooking process is that a certain amount of the radiant energy incident on the meat surface is converted into conductive heat which slowly diffuses from the outermost layer of meat to the cooler interior parts of the meat, a process to be allowed to continue for such time as is necessary to bring the meat to a desired state of doneness (namely, rare, well-done, and so on). As pointed out above, it appears that the best grilling results are obtained if the irradiated meat surface, in the case of steak, say, is not allowed to surpass 350°, irrespective of what the grilling time may be to reach a given state of doneness under the surface temperature regime the grilling is constrained to follow.

We therefore construct plate 3 such that if it is subjected on its under surface to the identical grilling radiation treatment that a piece of meat is subjected to at the same time the coil 4 will be heated to the temperature of the irradiated surface of the said meat. In consequence of the construction we adopt, the plate 3 becomes so heated that it reradiates about enough heat to the coil 4 that the latter assumes the temperature of the said irradiated surface of the meat.

However, it is not possible to specify the constructional principles involved in the form of a hard and fast rule, for the heat exchange process occurring is complex. Thus, the lower surface of plate 3, the upper surface of plate 3 and the bimetallic spiral each has radiation properties that may need to be taken into account, as may relevant properties of the other parts of the thermometer. Again, some grilling radiation is received by coil 4 directly via holes 19, and the rising hot gases that circulate through the thermometer, entering via holes 19 and leaving via eyelet 10, will also influence the temperature of coil 4.

However, we have found that if the plate 3 is made of stainless steel, has its lower surface matte-finished (as by sand-blasting) and partly blackened with a silicone enamel, and has its upper surface coated substantially entirely with the same enamel, it is possible to provide a conventional or stock type of bimetallic coil 4 which, if calibrated as described above, will indicate meat surface temperatures with sufficient precision as to allow successfully grilling of meat as taught herein.

The plate 3, it appears, functions approximately like the outermost layer of the heated side of the piece of meat being grilled, for in practice, what we took to be the surface temperature of the heated side of the meat was in reality the temperature of this layer (measured as by embedding a thermocouple junction in this layer to substantially the effective depth of the junction).

It seems plausible to consider that the plate 3 converts thermal radiation to heat as if it were a layer of meat being grilled, so that it attains substantially the same temperature as said layer at the same time. Moreover, it is certain that the radiation exchange alone, between plate 3 and coil 4, cannot heat coil 4 to the temperature of the plate, and that gases and radiation entering holes 19 affect the temperature of coil 4. Be this as it may, thermocouple surface temperature measurements, as described supra, in general do not differ more than 5–10 degrees from those indicated by a thermometer according to the invention, calibrated as described above, and exposed to the grill heat along with the meat the effective surface temperature of which is being measured by thermocouples. As 5–10 degrees is a tolerable error for instruments using bimetallic coils and designed for use in cooking temperature ranges, and as the possible error in calibrating and reading the device is about the same value, the therometer's indications are as accurate as they would be were the spiral 4 directly, and with substantially perfect efficiency, heated directly by the grilled surface layer of meat.

In short, it appears that the meat-layer simulation is the basic factor in the operation of the novel thermometer. This is confirmed as a practical matter by the fact that the thermometer is not operative as described if the surfaces of plate 3 are shiny.

The contribution of the grilling environment, other than as indicated above is minimized. Thus, the circulatory effect due to holes 19 and sleeve 10, prevent the space inside the thermometer from defining a stagnant gas pocket which, by convection, would couple the coil 4 thermally to the entire thermometer structure. Also, plate 3 being stainless steel, it is a poor heat conductor, so that heat contribution by conduction through post 15 is minimized. Finally, transparent cover 1 does not trap radiation incident thereon, and does not radiate efficiently, so that it does not contribute significantly to the temperature of coil 4.

Though practical application of the above principles is an empirical matter not reducible to a formula applicable to the general case, clearly such application is well within the ordinary skill of an artisan having the benefit of the present disclosure. However, by way of example, the following is a table of salient structural characteristics that if followed will provide a practical thermometer according to the invention:

Cover 1—Tempered soda-lime glass, 5/32" thick
Plate 3—17-7 stainless steel, 0.025" thick, 2.710" diameter, with 6 holes 19, 1/8" in diameter, located as shown.
Coil 4—Truflex 63 bimetallic strip 0.007"±0.00025" thick by 1/8"±0.0203 wide. (The term Truflex 63 is presently common currency of the bimetallic material manufacturers to designate the materials of the strip and their treatment.)

As is evident from FIGURE 1, the top surface of plate 3 is solidly black, and FIGURE 3 shows that about 50% of the lower surface is solid black (hatching 3a indicating the solid black in FIGURE 3). Prior to blackening, the plate was sandblasted on both sides to provide a dull matte finish, and the blackened portions represent one or more painted-on layers of high-temperature, black silicone enamel. Best results are attained with the holes 19 located as shown, rather than near the periphery of plate 3. Dimensions half those in FIGURE 2, and the same as those in FIGURES 1 and 3 of the drawings filed herewith, would be suitable, and have been used in a successful commercial embodiment of the invention.

In summary, it may be stated that the ideal situation would be that plate 3 is such as to attain the temperature of the meat surface being grilled, and that coil 4 in turn absorbs the heat of the plate in sufficient amount to attain the temperature of the plate. The specific constructional features disclosed herein exemplify a practical, close approximation to this ideal situation, in essence making radiation from plate 3 the main heating influence on coil 4, and ventilating the housing to prevent heating of coil 4 by "greenhouse effect."

Hanger 6, by virtue of its shape serves as means to support the thermometer from a rack or the like, and particularly as means by which the thermometer can be lifted off the grill using, instead of the bare hand, some culinary tool. As the tools used in grilling operations are fairly clumsy, the hanger has fairly large dimensions, which also favor the use of the hanger as an indicator that is easily settable and readably visible. Thus, hanger 6 provides means to set off the desired temperature on scale 23 so that the course of the grilling can be observed by observing whether or not pointer 5 and end 7 coincide. If they do not, then the usual measures may be taken to vary the influence of the radiant heat on meat and thermometer. For example, if pointer 5 reads more than the temperature indicated by end 7, one may increase spacing between grill and charcoal so that thermometer and meat are further from the source of radiant heat, and so on. It will be observed that the hook-like shape and dimensions of the hanger facilitate setting the hanger by means of culinary tool, rather than by bare hand.

It will be observed that the thermometer according to the invention is of simple, reliable construction and its manufacture would be little different from that of a conventional thermometer once the specifications for plate 3 suitable for a given type of spiral 4 are determined. It is also evident that various structural features, such as the shape of cover 1, the mounting of spiral 4, the manner of securing plate 3 and cover 1 together, the materials used, and so on, could be other than illustrated without affecting the principles of the invention. Accordingly, we do not contemplate our invention to be limited save as may be required by the annexed claims.

We claim:

1. In combination with a radiant heat cooking source, a radiant heat thermometer, means to support a piece of food in cooking relation with respect to the radiant heat from said source, and means to support said radiant heat thermometer in radiant heat receiving relation to said source;

said thermometer having a radiant heat collecting element constructed and arranged to collect said source's radiant heat like the surface being cooked of said piece of food, said element comprising a plate having one surface facing said source, said one surface being of a highly emissive nature;

a heat sensing device responsive to the heat in said radiant heat collecting element, said device being responsive to said heat in said element to indicate the temperature said piece of food would attain at a surface thereof exposed to said radiant heat.

2. The invention of claim 1, and including a cover member closed by said plate, there being a space between said plate and said cover member, said heat sensing device being mounted in said space, and said plate and said cover member being apertured to permit flow of gas into and out of said space.

3. The invention of claim 2, wherein the other surface of said plate is also of a highly emissive nature.

4. The invention of claim 2, wherein there is an aperture in said cover, and a hanger member mounted therein;

said heat sensing device having a pointer and a scale plate having a scale of values thereon, and being constructed and arranged such that said pointer rotates about a given axis to positions readable on said scale of values;

said hanger member being rotatable about said given axis and having a pointer-like portion extending radially from said given axis, said hanger member and said cover member being constructed and arranged such that said hanger member can be manually rotated to various fixed positions readable on said scale of values.

5. In combination with a radiant heat cooking source, a radiant heat thermometer, means to support a piece of food in cooking relation with respect to the radiant heat from said source, and means to support said radiant heat thermometer in radiant heat relation to said source;

said thermometer having a radiant heat collecting element constructed and arranged to collect radiant heat from said source, like the surface being cooked of said piece of food;

a heat sensing device responsive to the heat in said radiant heat collecting element, said device being responsive to said heat in said element to indicate the temperature said piece of food would attain at a surface thereof exposed to said radiant heat;

a hanger member rotatably mounted on said thermometer; said heat sensing device having a pointer and a scale of values and being constructed and arranged such that said pointer rotates about a given axis to positions readable on said scale of values; and said hanger being rotatable about said axis, and being constructed and arranged such that said hanger member can be manually rotated to various fixed positions readable on said scale of values.

6. A food grilling thermometer, comprising an element responsive to food grilling radiant heat such as to attain such temperature as it would have were it a food surface layer subject to said heat, said element being a poorly heat-conductive plate having surfaces highly emissive of radiant heat, and a bimetallic spiral having its plane over and substantially parallel to one of said surfaces and being constructed and arranged to indicate the temperature of said element.

7. The thermometer of claim 6, wherein said plate is perforated, there is a perforated cover, said plate and said cover being arranged to provide between them a space totally closed save for such perforation, and said spiral being mounted in said space.

8. A radiant heat thermometer comprising a radiant heat collecting element; a heat sensing device responsive to the heat in said radiant heat collecting element; housing structure including said element, said housing structure substantially totally enclosing said device, said element and another portion of said housing structure being apertured to permit flow of gases both into the space occupied by said device within said housing structure and out thereof; said element being constructed and arranged to collect radiant heat from a source external to said housing structure and to collect said radiant heat like a food surface being cooked by said radiant heat.

9. The invention of claim 8, wherein the said element is a plate and the surface of the side thereof external to said space is highly emissive.

10. The invention of claim 8, wherein the said element is a plate and the surfaces of both sides thereof are highly emissive.

11. The invention of claim 8, wherein a hanger member is provided, said hanger member being fixed to said housing structure and constructed and arranged to be rotated to various positions about a given axis; said heat sensing device including scale means and pointer means, and being constructed and arranged such that response of said sensing means to heat is indicated by rotation of said pointer means with respect to said scale means, and such rotation being about said given axis.

(References on following page)

References Cited

UNITED STATES PATENTS

| | | | |
|---|---|---|---|
| 1,474,903 | 11/1923 | Hase | 73—355 |
| 1,637,050 | 7/1927 | Rankin | 73—363.9 |
| 1,888,298 | 11/1932 | Teesdale. | |
| 2,150,245 | 3/1939 | Reinking. | |
| 2,701,964 | 2/1955 | Argabrite | 73—343 |
| 2,935,711 | 5/1960 | Christensen | 73—355 |
| 3,060,585 | 10/1962 | Kirk | 73—363.5 |

FOREIGN PATENTS

| | | |
|---|---|---|
| 1,205,140 | 4/1961 | France. |

S. CLEMENT SWISHER, *Primary Examiner.*

WILLIAM A. HENRY, II, *Assistant Examiner.*